United States Patent
Caveny et al.

(10) Patent No.: US 7,664,654 B2
(45) Date of Patent: *Feb. 16, 2010

(54) METHODS OF TREATING SUBTERRANEAN FORMATIONS USING WELL CHARACTERISTICS

(75) Inventors: William J. Caveny, Rush Springs, OK (US); Ronney R. Koch, Duncan, OK (US); Rickey L. Morgan, Duncan, OK (US); Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/594,552

(22) Filed: Nov. 7, 2006

(65) Prior Publication Data

US 2007/0055536 A1 Mar. 8, 2007

Related U.S. Application Data

(63) Continuation of application No. 10/929,285, filed on Aug. 30, 2004.

(51) Int. Cl.
*G06Q 99/00* (2006.01)
(52) U.S. Cl. .................... 705/1; 705/37; 705/40; 705/400; 166/292
(58) Field of Classification Search ............... 705/1, 705/37, 40, 400; 166/53, 292; 542/2
See application file for complete search history.

(56) References Cited

U.S. PATENT DOCUMENTS

| | | | | |
|---|---|---|---|---|
| 3,660,649 A | * | 5/1972 | Gilchrist et al. | 705/400 |
| 3,761,701 A | | 9/1973 | Wilder et al. | 135/193 |
| 4,845,628 A | * | 7/1989 | Gray et al. | 702/9 |
| 5,511,037 A | | 4/1996 | Randall et al. | 367/33 |
| 5,736,594 A | * | 4/1998 | Boles et al. | 524/2 |
| 5,794,720 A | | 8/1998 | Smith et al. | 175/40 |

(Continued)

FOREIGN PATENT DOCUMENTS

EP 621247 A2 * 10/1994

(Continued)

OTHER PUBLICATIONS

Booth et al., "Meeting Future Drilling Planning and Decision Support Requirementys; A New Drilling Simulator", Feb. 27-Mar. 1, 2001, SPE/IADC Drilling Conference, Amsterdam. The Netherlands, SPE/IADC 67816, pp. 1-13.*

(Continued)

*Primary Examiner*—John W Hayes
*Assistant Examiner*—Freda A Nelson
(74) *Attorney, Agent, or Firm*—Craig W. Roddy; Tumey, LLP

(57) ABSTRACT

An embodiment includes a method of treating a subterranean formation that comprises obtaining one or more well characteristics for a well servicing treatment, determining a price of the well servicing treatment based on the one or more well characteristics, and performing the well servicing treatment in the subterranean formation. Another embodiment includes a method of treating a subterranean formation that comprises obtaining one or more well characteristics for a cementing operation, determining a price of the cementing operation based on the one or more well characteristics, and performing the cementing operation in the subterranean formation.

27 Claims, 8 Drawing Sheets

U.S. PATENT DOCUMENTS

| | | | |
|---|---|---|---|
| 5,911,131 A | 6/1999 | Vig | 705/1 |
| 5,924,048 A | 7/1999 | McCormack et al. | 702/13 |
| 5,960,411 A | 9/1999 | Hartman et al. | 705/26 |
| 5,992,519 A | 11/1999 | Ramakrishnan et al. | 166/250.15 |
| 6,002,985 A | 12/1999 | Stephenson et al. | 702/13 |
| 6,012,016 A | 1/2000 | Bilden et al. | 702/12 |
| 6,101,447 A * | 8/2000 | Poe, Jr. | 702/13 |
| 6,109,368 A | 8/2000 | Goldman et al. | 175/39 |
| 6,131,673 A | 10/2000 | Goldman et al. | 175/40 |
| 6,178,406 B1 | 1/2001 | Cheetham et al. | 705/10 |
| 6,236,894 B1 | 5/2001 | Stoisits et al. | 700/28 |
| 6,266,619 B1 | 7/2001 | Thomas et al. | 702/13 |
| 6,356,844 B2 | 3/2002 | Thomas et al. | 702/12 |
| 6,408,953 B1 | 6/2002 | Goldman et al. | 175/39 |
| 6,553,522 B1 | 4/2003 | Dalal et al. | 714/724 |
| 6,609,098 B1 | 8/2003 | DeMarcken | 705/6 |
| 6,612,382 B2 | 9/2003 | King | 175/40 |
| 6,697,738 B2 | 2/2004 | Ravi et al. | 702/6 |
| 6,767,398 B2 | 7/2004 | Trato | 106/751 |
| 6,775,578 B2 | 8/2004 | Couet et al. | 700/28 |
| 6,826,448 B2 * | 11/2004 | Kaga et al. | 700/231 |
| 6,826,482 B2 | 11/2004 | Pandey | 702/6 |
| 6,826,543 B1 | 11/2004 | Harford et al. | |
| 6,853,921 B2 | 2/2005 | Thomas et al. | 702/14 |
| 6,876,959 B1 | 4/2005 | Peirce et al. | |
| 6,913,080 B2 | 7/2005 | Lehman et al. | 466/252.3 |
| 6,985,750 B1 | 1/2006 | Vicknair et al. | 455/519 |
| 6,985,871 B2 | 1/2006 | Simon et al. | |
| 7,346,531 B2 | 3/2008 | Jacobs | |
| 2001/0023614 A1 | 9/2001 | Tubel et al. | 73/152.39 |
| 2001/0056339 A1 | 12/2001 | Robinson et al. | 703/10 |
| 2002/0035551 A1 | 3/2002 | Sherwin et al. | 705/412 |
| 2002/0038449 A1 | 3/2002 | Green et al. | 717/1 |
| 2002/0046147 A1 * | 4/2002 | Livesay et al. | 705/37 |
| 2002/0049667 A1 | 4/2002 | Navani et al. | 705/37 |
| 2002/0052769 A1 | 5/2002 | Navani et al. | 705/7 |
| 2002/0069210 A1 | 6/2002 | Navani et al. | 707/104.1 |
| 2002/0087490 A1 | 7/2002 | Ueda et al. | 705/400 |
| 2002/0100584 A1 * | 8/2002 | Couet et al. | 166/250.15 |
| 2002/0116210 A1 | 8/2002 | Medina et al. | |
| 2002/0153134 A1 | 10/2002 | Newman | 166/53 |
| 2002/0165802 A1 | 11/2002 | Harrison et al. | 705/27 |
| 2002/0188500 A1 | 12/2002 | Kwok et al. | 705/10 |
| 2003/0028325 A1 | 2/2003 | Roggero et al. | 702/11 |
| 2003/0028393 A1 | 2/2003 | Coulston et al. | 705/1 |
| 2003/0074391 A1 * | 4/2003 | Carter et al. | 709/200 |
| 2003/0149673 A1 | 8/2003 | Aday et al. | 705/400 |
| 2003/0191724 A1 | 10/2003 | Turra et al. | 705/400 |
| 2003/0229599 A1 | 12/2003 | Sakurai et al. | 705/400 |
| 2004/0000430 A1 | 1/2004 | King | 175/24 |
| 2004/0045705 A1 | 3/2004 | Gardner et al. | |
| 2004/0064421 A1 | 4/2004 | Bailey | |
| 2004/0103376 A1 | 5/2004 | Pandey | |
| 2004/0138818 A1 | 7/2004 | Shray et al. | |
| 2004/0205576 A1 | 10/2004 | Chikirivao et al. | |
| 2004/0256102 A1 * | 12/2004 | Trato | 166/292 |
| 2004/0268338 A1 | 12/2004 | Gurpinar et al. | |
| 2005/0038603 A1 | 2/2005 | Thomas et al. | |
| 2005/0115711 A1 | 6/2005 | Williams et al. | |
| 2005/0119911 A1 | 6/2005 | Ayan et al. | |
| 2005/0149306 A1 | 7/2005 | King | |
| 2005/0149307 A1 | 7/2005 | Gurpinar et al. | |
| 2005/0176590 A1 | 8/2005 | Lehman et al. | |
| 2005/0209836 A1 | 9/2005 | Klumpen et al. | |
| 2005/0209866 A1 | 9/2005 | Veeningen et al. | |
| 2005/0209912 A1 | 9/2005 | Veeningen et al. | |
| 2006/0047527 A1 | 3/2006 | Caveny et al. | |
| 2007/0094368 A1 | 4/2007 | Erb et al. | |
| 2007/0203723 A1 | 8/2007 | Segura et al. | |
| 2008/0065445 A1 | 3/2008 | Livesay et al. | |

FOREIGN PATENT DOCUMENTS

| | | |
|---|---|---|
| GB | 2 219 613 A | 12/1989 |
| GB | 2219613 | 12/1989 |
| GB | 2 397 664 A | 7/2004 |
| GB | 2397664 | 7/2004 |
| WO | WO 2004/070650 A1 | 8/2004 |
| WO | WO 2004070650 | 8/2004 |
| WO | WO 2004/076816 A1 | 9/2004 |
| WO | WO 2004076816 | 9/2004 |
| WO | WO 2005001661 | 1/2005 |
| WO | WO 2005091096 | 9/2005 |

OTHER PUBLICATIONS

Rauzi, Stephen L., "Want to Drill an Oil Well", Spring 2003, Arizona Geological Survey, vol. 33, No. 1.*
Office action dated Nov. 20, 2006 from U.S. Appl. No. 10/929,285.
Office Action dated May 18, 2006 for U.S. Appl. No. 10/929,285.
Office Action dated Nov. 20, 2006 for U.S. Appl. No. 10/929,285.
Office Action for U.S. Appl. No. 10/929,285 dated May 3, 2007.
Office Action dated Jan. 23, 2008 from U.S. Appl. No. 10/929,285.
Final Office Action mailed Jul. 3, 2008, from U.S. Appl. No. 10/929,285.
Office Action for U.S. Appl. No. 10/939,285, dated Dec. 24, 2008.
SPE 16839 paper entitled "Twenty-Seven Years After Grayson: Who is Using Decision Analysis" by J. Williams, 1987.
USPTO Office Action from U.S. Appl. No. 11/363,684 mailed Oct. 7, 2008.
USPTO Office Action from U.S. Appl. No. 10/929,285 mailed Dec. 30, 2004.
USPTO Office Action from U.S. Appl. No. 10/929,285 mailed Feb. 23, 2006.
IPS Secures Exclusive Rights To New Gas Well Optimization Technology; Nov. 13, 2001; Business Wire.
Office Action from U.S. Appl. No. 11/363,684 dated Jun. 16, 2009.
Office Action for U.S. Appl. No. 10/929,285 dated May 29, 2009.
IPS Secures Exclusive Rights to New Gas Well Optimization Technology.
Williams, J., "Twenty-Seven Years After Grayson: Who is Using Decisions Analysis," SPE 16839, dated Sep. 1987.
Office action dated Dec. 30, 2004 from U.S. Appl. No. 10/929,285.
Office action dated Jun. 10, 2005 from U.S. Appl. No. 10/929,285.
Office action dated Sep. 13, 2005 from U.S. Appl. No. 10/929,285.
Office action dated Feb. 23, 2006 from U.S. Appl. No. 10/929,285.
Booth et al., "Meeting Future Drilling Planning and Decision Support Requirements: A New Drilling Simulator," SPE/IADC 67816, pp. 1-13, 2001.

* cited by examiner

METHODS OF TREATING SUBTERRANEAN FORMATIONS USING WELL CHARACTERISTICS

CROSS-REFERENCE TO RELATED APPLICATIONS

The present application is a continuation of U.S. application Ser. No. 10/929,285 filed Aug. 30, 2004, the disclosure of which is incorporated herein by reference.

BACKGROUND

The present invention relates to determining, pricing, and/or providing well servicing treatments. More particularly, the present invention relates to novel well characteristic methodologies for determining, pricing, and/or providing well servicing treatments and data processing systems therefor.

Generally, well servicing treatments include a wide variety of subterranean operations that may be performed in oil, gas, geothermal, and/or water wells, such as drilling, completion, and workover operations. The drilling, completion, and workover operations may include, but are not limited to, drilling, fracturing, acidizing, logging, cementing, gravel packing, perforating, and conformance operations. Many of these well servicing treatments are designed to enhance and/or facilitate the recovery of desirable fluids from a subterranean well.

Oilfield service companies and the like, who provide well servicing treatments, operate in a competitive environment, often involving competition from other companies providing the same or similar services. Consequently, oilfield service companies desire to accurately and cost-effectively determine the price of their respective well servicing treatments to maintain their competitiveness. Conventionally, the price for well servicing treatments have been determined based, inter alia, on the particular well servicing treatment to be performed. For instance, well servicing treatments have been priced based on the component cost of the treatment fluid. The price of the well servicing treatment may include pricing for chemicals, tools, labor, and/or equipment involved in the well servicing treatment. For instance, in a cementing operation, an optimal cement composition for the operation may first be determined using past well data or characteristics about the field. Next, the price of the cement composition may be determined based on the component cost of the optimal cement composition, the total amount of the cement composition needed for the operation, the labor and equipments costs that may be associated with the operation, and desired profitability, taking into account any discounts that may apply. To determine a price for a desired well servicing treatment, the labor and equipment costs associated with the particular well servicing treatment should be taken into account.

There are drawbacks to the current pricing methodologies. For example, current methodologies generally require a determination of the desired formulation of the treatment fluid prior to the determination of the price of the well servicing treatment. This may result in inaccuracies in the determined price and/or the use of formulations that are not the most desirable and/or cost-effective. Also, current methodologies do not allow formulation changes (and corresponding price changes) to be made in a real-time context. Thus, there may be undesirable delays between the submission of information by the customer relating to the well servicing treatment and the provision of a price for the well servicing treatment to the customer, and in determining and providing the well servicing treatment. Furthermore, current pricing methodologies generally do not effectively utilize computer systems and wireless area networks to generate and transmit prices of well servicing treatments.

SUMMARY

The present invention relates to determining, pricing, and/or providing well servicing treatments. More particularly, the present invention relates to novel well characteristic methodologies for determining, pricing, and/or providing well servicing treatments and data processing systems therefor.

In one embodiment, the present invention provides a method of pricing a well servicing treatment based on well characteristics that comprises obtaining one or more well characteristics of the well servicing treatment; and generating a price of the well servicing treatment based on the one or more well characteristics. In certain embodiments, at least one of the steps of obtaining the one or more well characteristics or generating a price of the well servicing comprises utilizing a data processing system.

In another embodiment, the present invention provides a method of pricing a well servicing treatment using well characteristic that comprises obtaining one or more well characteristics of the well servicing treatment, wherein the one or more well characteristics are obtained from a user by a data processing system capable of generating a price of the well servicing treatment; and generating a price of the well servicing treatment based on the one or more well characteristics utilizing the data processing system.

In another embodiment, the present invention provides a method of pricing a well servicing treatment that comprises obtaining one or more well characteristics of the well servicing treatment over a communication link that comprises a direct connection, a private network, a virtual private network, a local area network, a wireless area network, an Internet-based communication system, a wireless communication system, a satellite communication system, or a combination thereof; generating a price of the well servicing treatment based on the one or more well characteristics; and transmitting the price of the well servicing treatment over the communication link.

In another embodiment, the present invention provides a method of pricing a cementing operation and selecting a cement composition for the cementing operation that comprises determining cement data for each cement composition of a set of cement compositions; using the cement data to calculate a total maximum stress difference for each of the set of cement compositions; obtaining one or more well characteristics of the cementing operation; determining well events; comparing the one or more well characteristics and well event stress states to the cement data from each of the set of cement compositions to determine effective cement compositions for the cementing operation; determining risk of cement failure for the effective cement compositions; and generating a price of the cementing operation based on the one or more well characteristics.

In another embodiment, the present invention provides a method of pricing a well servicing treatment during real-time performance of the well servicing treatment that comprises obtaining one or more well characteristics of a well servicing treatment while the well servicing treatment is in progress; and generating a price of the well servicing treatment based on the one or more well characteristics that were received, wherein the price of the well servicing treatment is generated while the well servicing treatment is in progress.

In another embodiment, the present invention provides a method of pricing a drilling operation and detecting and visualizing changes in a well bore, during real-time performance of the drilling operation that comprises obtaining one or more well characteristics of the drilling operation, while the well servicing treatment is in progress; generating a price of the well servicing treatment based on the one or more well characteristics that were received, wherein the price of the well servicing treatment is generated while the well servicing treatment is in progress; correlating a time-depth file and a time-data file to obtain a plurality of measurements at a specific depth for a particular well characteristic; analyzing a change of the particular well characteristic using at least two of the plurality of the measurements to obtain an interpretation of the change of the particular well characteristic; and displaying the interpretation of the change of the particular well characteristic using a graphical representation.

In another embodiment, the present invention provides a computer program, stored on a computer-readable medium, for pricing a well servicing treatment using well characteristics, the program constructed and arranged to: obtain one or more well characteristics of the well servicing treatment; and generate a price of the well servicing treatment based on the one or more well characteristics.

In yet another embodiment, the present invention provides a data processing system for pricing a well servicing treatment that comprises a processor; a memory communicatively coupled to the processor; and software operable to execute on the processor to obtain one or more well characteristics of the well servicing treatment, and generate a price of the well servicing treatment based on the one or more well characteristics.

The features and advantages of the present invention will be readily apparent to those skilled in the art upon a reading of the description of the specific embodiments that follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to determining, pricing, and/or providing well servicing treatments. More particularly, the present invention relates to novel well characteristic methodologies for determining, pricing, and/or providing well servicing treatments and data processing systems therefor. The price of the well servicing treatment may include pricing for chemicals, tools, labor, and/or equipment involved in the well servicing treatment. The methods of the present invention may be used for generating a price for a wide variety of well servicing treatments that may be performed in oil, gas, geothermal, and/or water wells, such as drilling, completion, and workover operations. The drilling, completion, and workover operations may include, but are not limited to, drilling, fracturing, acidizing, logging, gravel packing, cementing, perforating, and conformance operations. In the drilling and completion of an oil or gas well, a cementing composition is often introduced in the well bore for cementing pipe string or casing. In this process, known as "primary cementing," a cementing composition is pumped into the annular space between the walls of the well bore and the casing. The cementing composition sets in the annular space, supporting and positioning the casing, and forming a substantially impermeable barrier, or cement sheath, which divides the well bore into subterranean zones.

Figure 1:
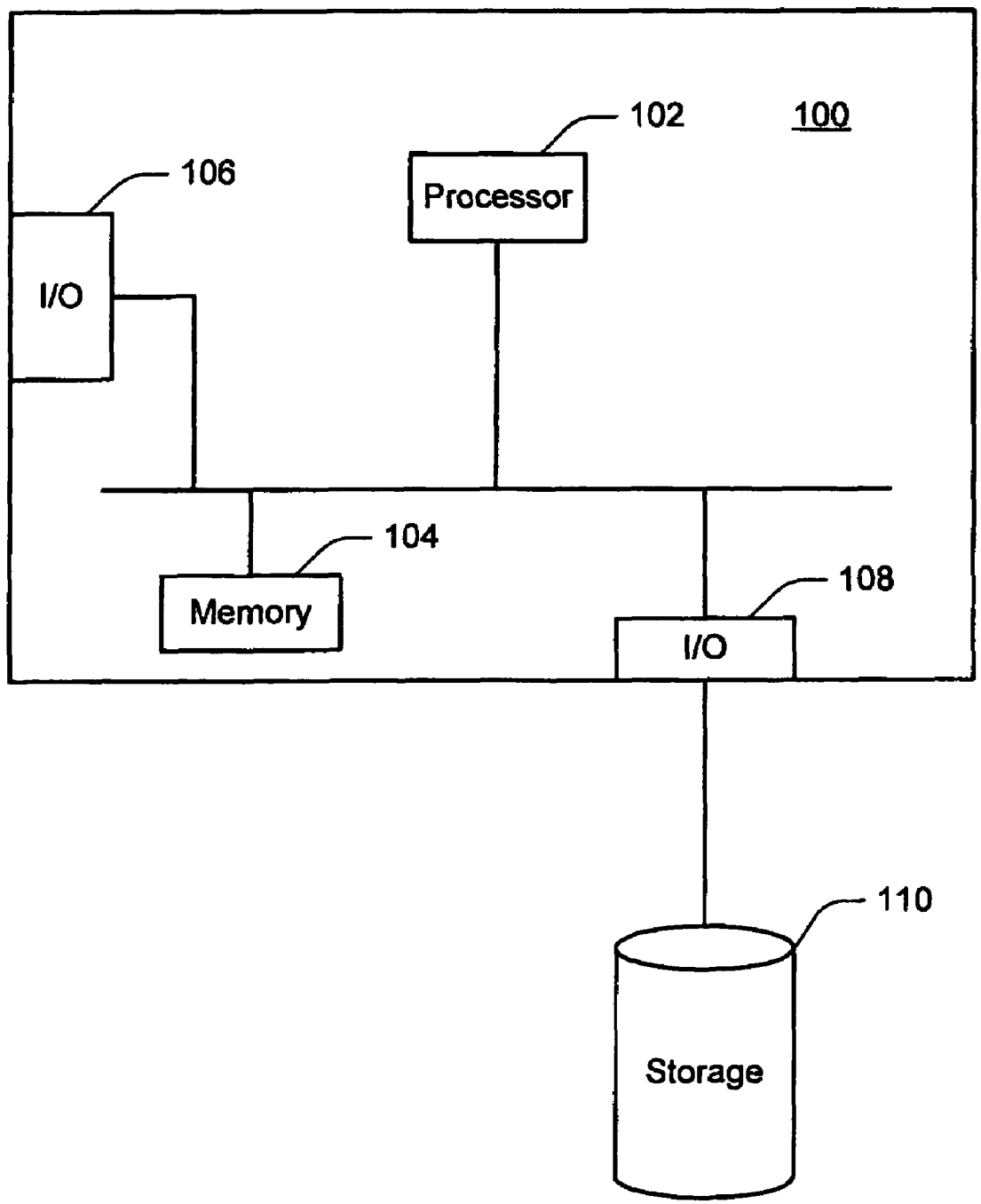
FIG. 1 is a block diagram depicting a computer system for implementing the methods of the present invention in accordance with an embodiment of the present invention.

The methods of the present invention may be implemented utilizing any suitable data processing system, including computer systems, handheld devices, or any other suitable device. A suitable data processing system may include a processor, memory, and software operable on the processor to implement the methods of the present invention. Referring now to FIG. 1, a computer system suitable for use with the present invention is depicted and generally referenced by numeral 100. Computer system 100 comprises a processor 102, memory 104, input out ("I/O") interface 106, and I/O interface 108. Processor 102 may comprise one central processing unit or may be distributed across one or more processors in one or more locations. Memory 104 should be communicatively coupled to processor 102. Memory 104 may be read-only memory, random-access memory, or the like. I/O interfaces 106 and I/O interfaces 108 should be communicatively coupled to processor 102. I/O interfaces 106 and I/O interfaces 108 may be any suitable system for connecting computer system 100 to a communication link, such as a direct connection, a private network, a virtual private network, a local area network, a wide area network ("WAN"), a wireless communication system, or combinations thereof; storage devices, such as storage 110; external devices, such as a keyboard, a monitor, a printer, a voice recognition device, or a mouse; or any other suitable system. Storage 110 also may be provided. Storage 110 should be communicatively coupled to I/O interfaces 108. Storage 110 may comprise any device suitable for storing data to be processed, including, but not limited to, compact disc drives, floppy drives, hard disks, and the like. Those of ordinary skill in the art will appreciate that suitable data processing systems may comprise additional, fewer, and/or different components than those described for computer system 100.

Figure 2:
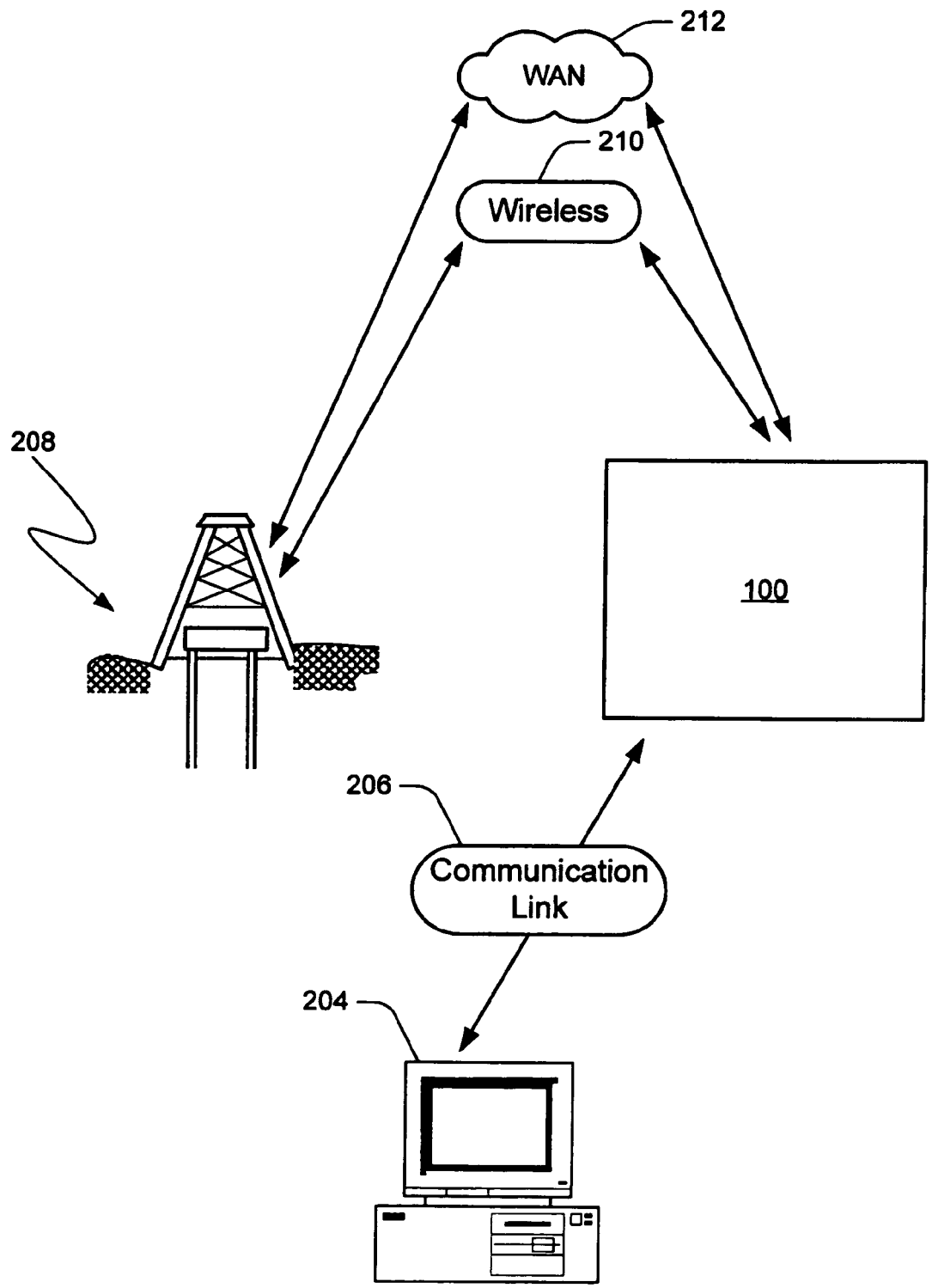
FIG. 2 is a block diagram depicting possible systems for obtaining and/or transmitting data in accordance with an embodiment of the present invention.

To generate a price of a well servicing treatment utilizing the methods of the present invention, computer system 100 should be able to obtain and transmit data needed therefor. FIG. 2 is a depiction of possible systems for obtaining and/or transmitting data (e.g., well characteristics, price, lists, etc.)

by computer system 100 in accordance with one embodiment of the present invention. In one embodiment, computer system 100 may obtain data from and/or transmit data to a user of computer system 100 via suitable I/O means, such as a keyboard, a mouse, a voice recognition device, and/or a monitor (not shown) that are communicatively coupled to computer system 100 via I/O interfaces 106, 108 (depicted on FIG. 1). As used herein, "user" is defined to include real persons, data processing systems (e.g., computer systems, etc.), or any other suitable mechanism. The user may be associated with a provider of well servicing treatments or be a customer of such provider of well servicing treatments. In other embodiments, computer system 100 may obtain data from and/or transmit data to a user of a second data processing system over a communication link, e.g., to a user of second computer system 204 that is communicatively coupled to computer system 100 via communication link 206. Communication link 206 may include a direct connection, a private network, a virtual private network, a local area network, a WAN (e.g., an Internet-based communication system), a wireless communication system (e.g., a satellite communication system, telephones), combinations thereof, or any other suitable communication link. In yet another embodiment, computer system 100 may obtain data from and/or transmit data to a well site 208 over a communication link. In these embodiments, data may be obtained from and/or transmitted to well site 208 over any suitable communication link, such as wireless communication system 210 (e.g., a satellite communication system) or WAN 212 (e.g., an Internet-based communication system). One of ordinary skill in the art will recognize other suitable systems over which computer system 100 may obtain and/or transmit data for a particular application.

Figure 3:
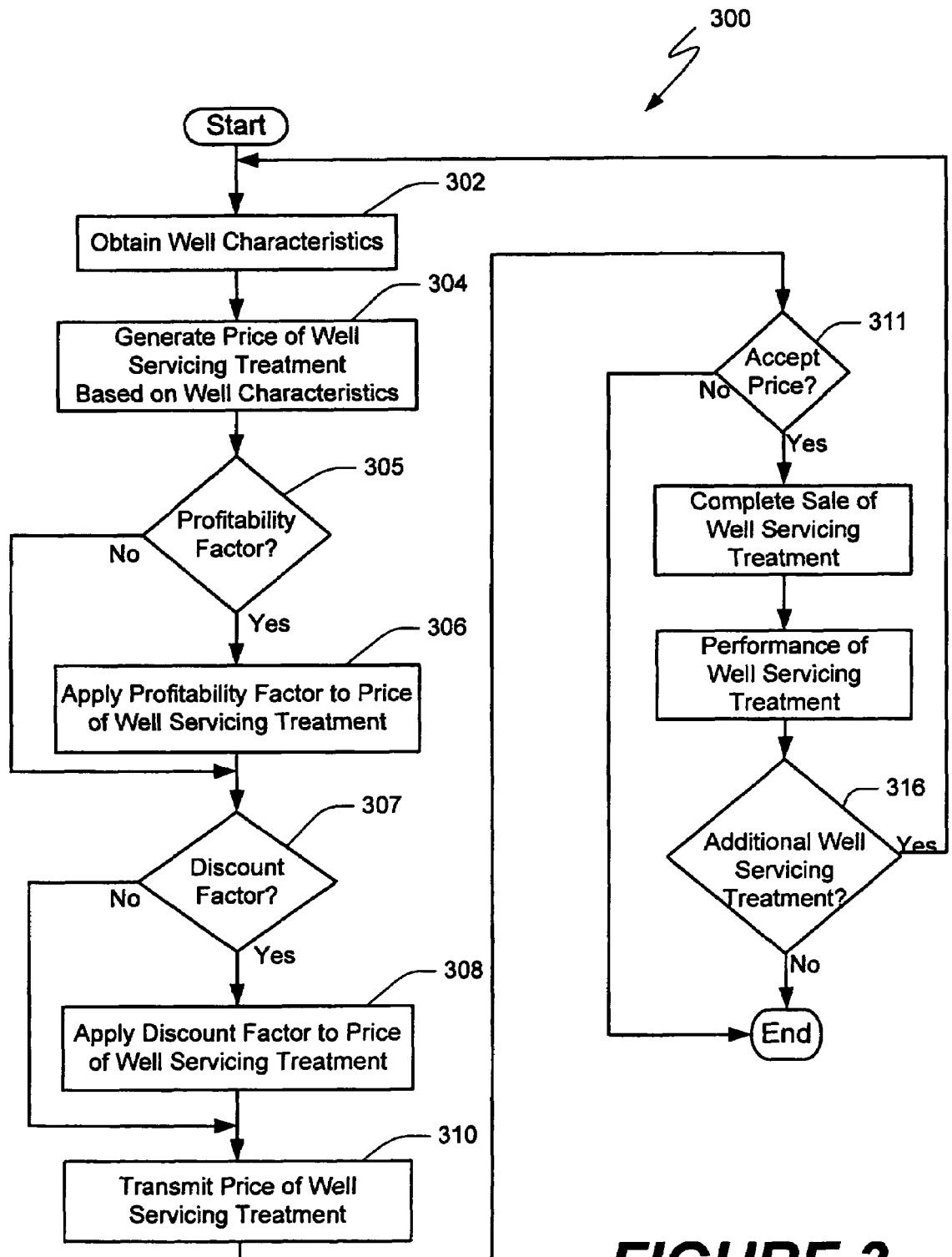
FIG. 3 is a flow chart for pricing a well servicing treatment in accordance with an embodiment of the present invention.

Referring to FIG. 3, a flow chart is illustrated that depicts an embodiment of the methods of the present invention, generally referred to as method 300. Method 300 generally involves generating a price for a well servicing treatment using well characteristics in accordance with one embodiment of the present invention. Method 300 of the present invention generally comprises obtaining one or more well characteristics for a well servicing treatment, depicted in block 302; and generating a price of the well servicing treatment based on the one or more well characteristics that were obtained, depicted in block 304. The methods of the present invention may further comprise optionally applying a profitability factor to the price of the well servicing treatment, depicted in block 306; optionally applying a discount factor to the price of the well servicing treatment, depicted in block 308; transmitting the price of the well servicing treatment, depicted in block 310; determining whether the transmitted price is accepted, depicted in block 311; completing a sale of the well servicing treatment based on the price of the well servicing treatment, depicted in block 312; performing the well servicing treatment, depicted in block 314; and determining whether an additional well servicing treatment will be performed, depicted in block 316.

In block 302 of FIG. 3, one or more well characteristics for a well servicing treatment are obtained. The well characteristics that were obtained may be for a particular well or set of wells (e.g., wells in a particular field) dependent upon the well servicing treatment. Each well characteristic may affect the price of a well servicing treatment. Well characteristics include a variety of routinely measurable or calculable parameters inherent in or desirable for a well for a particular treatment, including, but not limited to, bottom-hole static temperature ("BHST"), bottom-hole circulating temperature ("BHCT"), applicable environmental regulations, depth, type of formation, type of hydrocarbons, geographical area, formation porosity, formation permeability, desired pump rate, desired density of a treatment fluid, desired level of fluid loss control, desired pump time, existence of thief zone, corrosion potential, pipe friction, and existence of reactive shale. The particular well characteristics used to generate the price of the well servicing treatment will vary, dependent, inter alia, on the desired well servicing treatment (e.g., drilling, completion, or workover), the particular well or set of wells, and other factors known to those of ordinary skill in the art. In one embodiment, where the well servicing treatment is a cementing operation, an example list of well characteristics comprises type of hydrocarbons, geographical area, type of formation, formation porosity, formation permeability, vertical depth, BHST, BHCT, desired pump rate, desired density of a cement composition, desired level of fluid loss control, desired pump time, corrosion potential, pipe friction, and existence of a thief zone.

The well characteristics may be obtained using a variety of techniques. In one embodiment where a data processing system (such as computer system 100, depicted in FIGS. 1-2) is used to implement the methods of the present invention, the well characteristics may be obtained from the user of another data processing system (such as second computer system 204 depicted in FIG. 2) over a communication link. In some embodiments where a data processing system is used, the well characteristics may be obtained by computer system 100 (depicted in FIGS. 1-2) from a user of computer system 100. Generally, any sensing technique and equipment suitable for detecting well characteristics with suitable sensitivity and/or resolution may be used to determine the well characteristics that are to be obtained. In some embodiments, the well characteristics may be determined using analytical methods, magnetic resonance imaging ("MRI"), formation evaluation, drill stem testing, logging tools, seismic methods, or other suitable techniques. For example, the well characteristics may be determined downhole with real-time date telemetry to the surface, or by delayed transfer (e.g., by storage of data downhole, followed by subsequent telemetry to the surface or subsequent retrieval of the downhole sensing device). In some embodiments, the well characteristics may be determined using any one or a combination of downhole logging-while-drilling sensors, measurement-while-drilling sensors, wireline and drillpipe-conveyed wireline tools, drillpipe-conveyed sensors, coiled tubing-conveyed sensors, casing-conveyed sensors, tractor-conveyed sensors, permanent downhole sensors, oilfield production data sensors, fluid-conveyed sensors, or other suitable sensors.

Table 1 provides an example list of well characteristics to be obtained for an example cementing operation. In Table 1, the well characteristics are listed as WCi, wherein i is 1 to n, wherein n may be any suitable integer, depending on, for example, the particular well or the particular well servicing treatment. The following list is a nonlimiting list of some well characteristics and in no way should be construed as an exhaustive list. The applicable well characteristics will be known to those of ordinary skill in the art, with the benefit of this disclosure, and can be taken into account in conjunction with the methods of the present invention.

TABLE 1

EXAMPLE WELL CHARACTERISTICS

| WCi | Well Characteristic |
|---|---|
| WC1 | TYPE OF HYDROCARBONS |
| WC2 | GEOGRAPHICAL AREA |

TABLE 1-continued

EXAMPLE WELL CHARACTERISTICS

| WCi | Well Characteristic |
|---|---|
| WC3 | TYPE OF FORMATION |
| WC4 | FORMATION POROSITY |
| WC5 | FORMATION PERMEABILITY |
| WC6 | VERTICAL DEPTH |
| WC7 | BHST |
| WC8 | BHCT |
| WC9 | DESIRED PUMP RATE |
| WC10 | DESIRED DENSITY OF CEMENT COMPOSITION |
| WC11 | DESIRED LEVEL OF FLUID LOSS CONTROL |
| WC12 | DESIRED PUMP TIME |
| WC13 | CORROSION POTENTIAL |
| WC14 | PIPE FRICTION |
| WC15 | EXISTENCE OF THIEF ZONE |
| WCN | WELL CHARACTERISTIC N |

Figure 4:
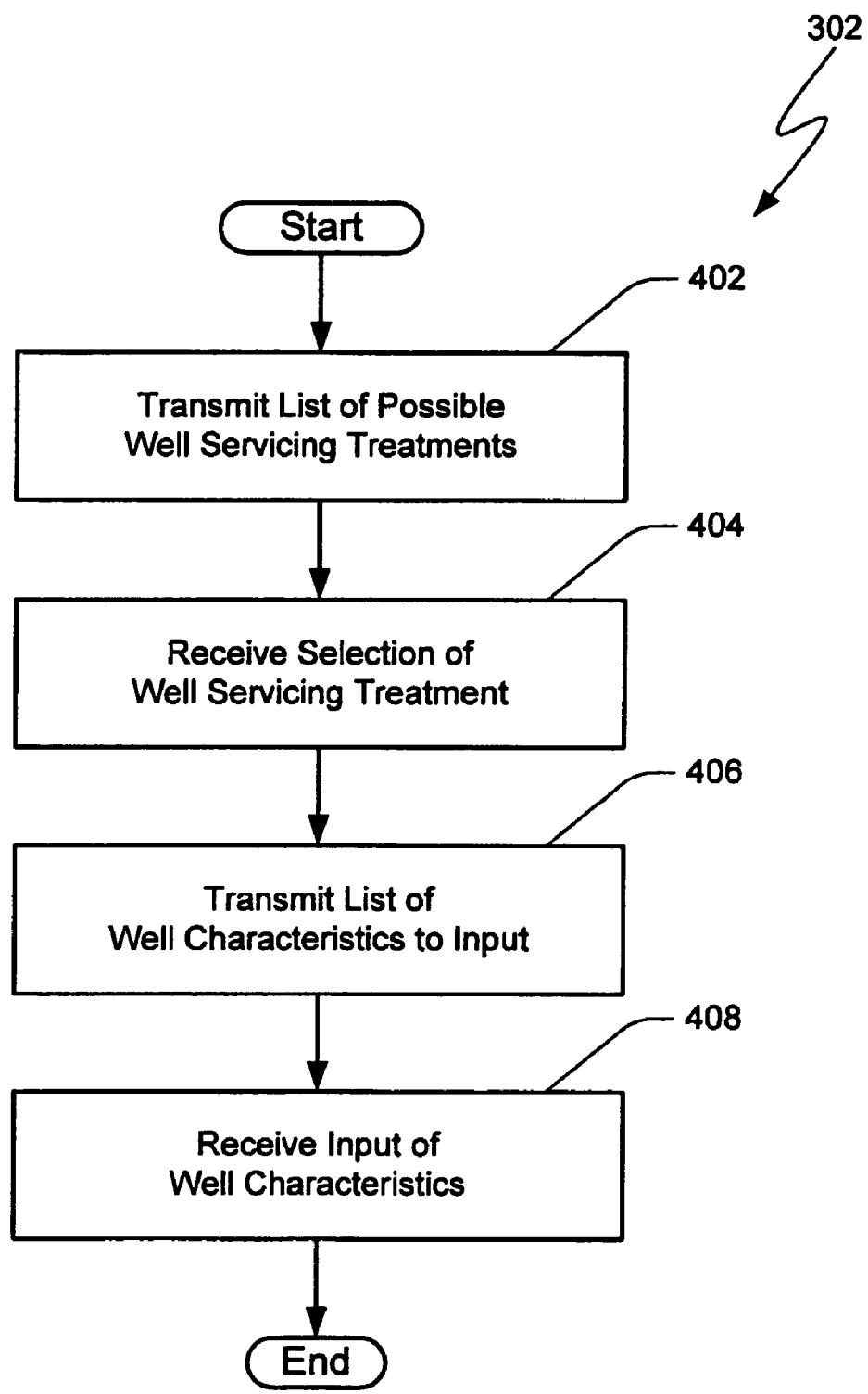
FIG. 4 is a flow chart for obtaining one or more well characteristics in accordance with an embodiment of the present invention.

Referring now to FIG. 4, a flow chart is illustrated that depicts one embodiment of the present invention for obtaining one or more well characteristics for a well servicing treatment, generally referenced by the numeral 302. In one embodiment, obtaining one or more well characteristics for a well servicing treatment may comprise transmitting a list of possible well servicing treatments to a user, depicted in block 402. In some embodiments, the list of possible well servicing treatments may be transmitted to the user as discussed above for the transmission of data by computer system 100 in relation to FIG. 2. The list of well servicing treatments may include any of a variety of well servicing treatments that may be performed in oil, gas, geothermal, and/or water wells, such as drilling, completion, and workover operations. The drilling, completion, and workover operations may include, but are not limited to, drilling, fracturing, acidizing, logging, gravel packing, cementing, perforating, and conformance operations. In some embodiments, the well servicing treatment may comprise nanoparticles.

Obtaining the one or more well characteristics for a well servicing treatment further may comprise receiving a selection of the well servicing treatment to be priced from the user based on the transmitted list of possible well servicing treatments, depicted in block 404 of FIG. 4. In some embodiments, the selection of the well servicing treatment may be received from the user as discussed above for the obtainment of data by computer system 100 in relation to FIG. 2. Referring again to FIG. 4, once the selection of the well servicing treatment is received, this embodiment further may comprise transmitting to the user a list of one or more well characteristics to input based on the well servicing treatment that was selected from the list, depicted in block 406. In some embodiments, the list of the one or more well characteristics to provide may be transmitted to the user as discussed above for the transmission of data by computer system 100 in relation to FIG. 2. The list of the one or more well characteristics to input may include a preselected list of well characteristics suitable for generating a price based on selection of the particular well servicing treatment that was received. Next, obtaining one or more well characteristics of the well servicing treatment further may comprise receiving from the user input of the one or more well characteristics of the well servicing treatment, depicted in block 408 of FIG. 4. In some embodiments, the input may be received from the user as discussed above for the obtainment of data by computer system 100 in relation to FIG. 2. The input of the one or more well characteristics received from the user generally should be based on the transmitted list of the one or more well characteristics to input.

Referring again to FIG. 3, in block 304, a price of the well servicing treatment is generated based on the one or more well characteristics that were obtained. In some embodiments, the price may be generated by a data processing system, such as computer system 100 (depicted in FIGS. 1-2) capable of generating a price of the well servicing treatment based on the one or more well characteristics. Generating a price of the well servicing treatment based on the one or more well characteristics may be accomplished by any suitable methodology, taking into account, for example, known and/or determinable factors and weights associated with each of the one or more well characteristics. For example, historical data for a number of previous well servicing treatments may be collected and analyzed. This historical data may include one or more well characteristics associated with the previous well servicing treatments and the overall prices for the previous well servicing treatments that include the cost of the chemicals, tools, and/or equipment utilized in the particular well servicing treatment. Once this historical data is collected and analyzed, a relationship may be determined between the well characteristics from the previous well servicing treatments and the overall price of the previous well servicing treatments. In some embodiments, this relationship between the price of a well servicing treatment and well characteristics may be expressed as a mathematical algorithm, wherein determining the price of the well servicing treatment may include utilization of the mathematical algorithm.

Figure 5:
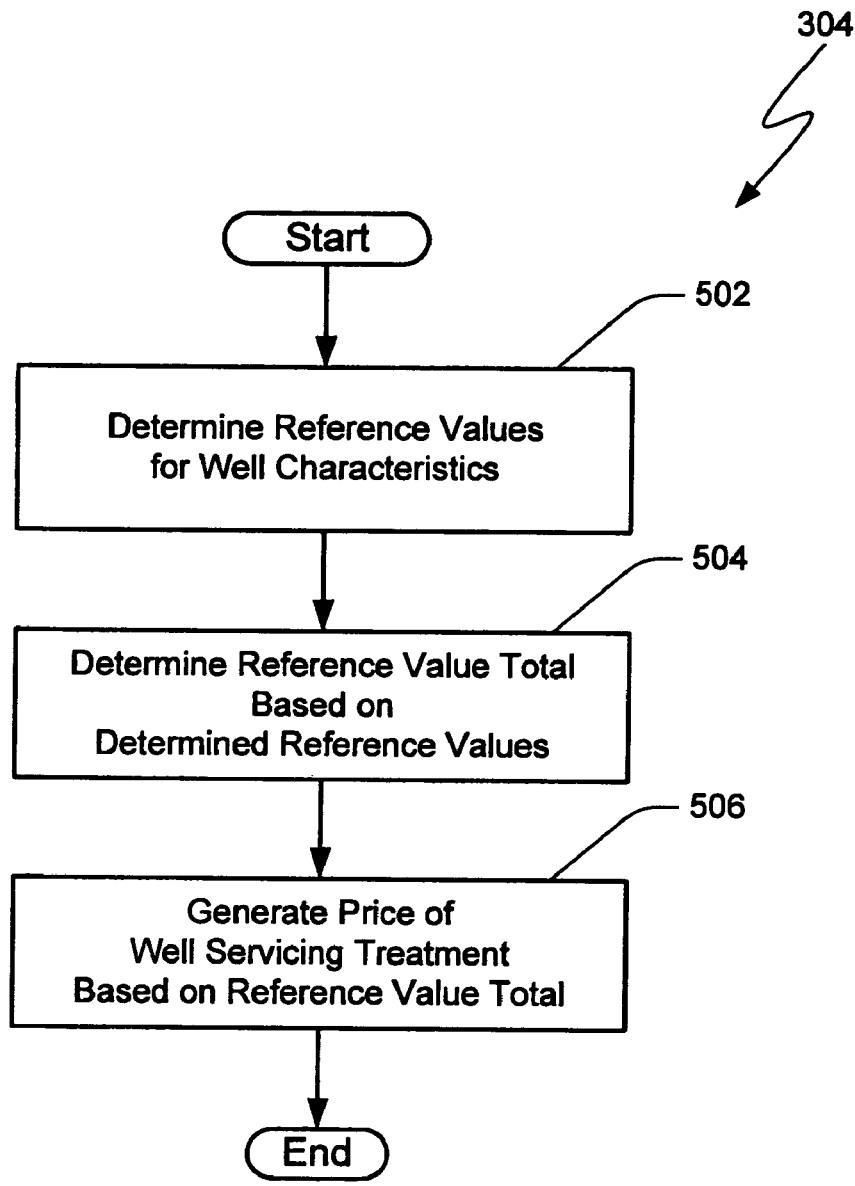
FIG. 5 is a flow chart for generating a price of a well servicing treatment in accordance with an embodiment of the present invention.

Referring now to FIG. 5, a flow chart is illustrated that depicts an embodiment of the present invention for generating a price of the well servicing treatment, generally referenced by the numeral 304. In one embodiment, generating a price of the well servicing treatment based on the one or more well characteristics may comprise determining reference values for the one or more well characteristics, depicted in block 502; determining a reference value total for the well servicing treatment based on the determined reference values, depicted in block 504; and generating a price of the well servicing treatment based on the reference value total for the well servicing treatment, depicted in block 506.

In block 502 of FIG. 5, reference values for the one or more well characteristics are determined. Generally, reference values represent the portion of the estimated well servicing treatment price associated with the particular well characteristic. Determination of a reference value for each of the well characteristics may be accomplished by any suitable methodology, taking into account, for example, known and/or determinable factors and weights associated with each well characteristic. These reference values may be stored in a medium (e.g., a database) for retrieval for use in conjunction with the present invention. In some embodiments, determination of reference values for the one or more well characteristics may be accomplished by collecting and analyzing historical data for a number of previous well servicing treatments. This historical data collected may include one or more well characteristics associated with the previous well servicing treatments and the overall prices for the previous well servicing treatments that include the cost of the chemicals, tools, labor, and/or equipment utilized in the particular well servicing treatment. Once this historical data is collected and analyzed, a relationship may be determined between the well characteristics from the previous well servicing treatments and the overall price of the previous well servicing treatments. In some embodiments, this relationship may be expressed as a mathematical algorithm, wherein determining a reference value for each of the well characteristics may include utilization of the mathematical algorithm.

In other embodiments, this relationship may be utilized to develop a look-up table for each of the well characteristics, wherein reference values for the one or more well characteristics may be determined by utilizing the look-up tables. An example of a look-up table for one of the well characteristics may look like Table 2, below. Generally, the look-up table for each of the well characteristics may have a number of levels, wherein the specific number of levels will be dependent upon the particular well characteristic and variations of that well characteristic. Each level may be given an associated reference value based on the determined relationship. Listed below in Table 2 is an example look-up table for a particular well characteristic, vertical depth, and the associated reference values for the different levels. One of ordinary skill in the art will know that the reference values listed in Table 2 are hypothetical examples and actual reference values will vary based on a number of factors, including, for example, the determined relationship between reference values and well characteristics.

TABLE 2

EXAMPLE LOOK-UP TABLE FOR DETERMINING REFERENCE VALUES

| Vertical Depth (ft) | Reference Value |
|---|---|
| 1,000 | 1 |
| 10,000 | 2 |
| 20,000 | 3 |
| 30,000 | 4 |
| 40,000 | 5 |

As will be discussed later, these reference values or others like these can be used to determine the price of the well servicing treatment. One of ordinary skill in the art, with the benefit of this disclosure, will understand that other suitable formats for reference values may be used in accordance with the methods of the present invention.

Look-up tables are not continuous and may include multiple discrete levels. For example, in the embodiment shown in Table 2, there are five discrete reference values listed for vertical depths of 1,000 feet to 40,000 feet. If the determined vertical depth was between or beyond one of these discrete levels, the reference value for the determined vertical depth may be interpolated or extrapolated between the associated reference values to determine the appropriate reference value. Furthermore, the relationship between the reference value and the well characteristic may be linear or nonlinear as determined by one of ordinary skill in the art, depending, for example, on the determined relationship between reference values and the particular well characteristic, which can be guided by the historical data. Certain well characteristics may indicate an exponential relationship between the well characteristics and a reference value for the well characteristics.

In some embodiments, a default reference value may be given to each of the well characteristics. Generally, the default reference values may be different for each of the well characteristics. In certain embodiments, the default reference value may represent the average portion of the price of a well servicing treatment associated with the particular well characteristics. This average portion may be determined by analysis of the collected data that was discussed above, e.g., from a database. In these embodiments, the default reference value for each of the well characteristics may be used in the generation of the price unless overridden by the obtainment of the particular well characteristic and subsequent determination of an associated reference value. The default reference values for each of the well characteristics may not be overridden for a number of reasons, such as where the data needed to determine the particular well characteristics is not provided and/or not available.

In block 504 of FIG. 5, a reference value total for the well servicing treatment is determined based on the determined reference values. Generally, in some embodiments, determination of a reference value total ("RVTOTAL") includes summation of the reference values for the one or more well characteristics, for example, in accordance with the following formula:

$$RV_{TOTAL} = \sum_{i=1}^{n} RV_i$$

wherein RVTOTAL is the reference value total for the well servicing treatment, RVi is the reference value for a particular well characteristic, and i is an integer from about 1 to about n, wherein n may be any suitable integer, depending on, for example, the particular well or the particular well servicing treatment. However, other methodologies for determining a reference value total may be used dependent on, for example, the form of the determined reference values.

In block 506 of FIG. 3, a price of the well servicing treatment is generated based on the reference value total for the well servicing treatment. In some embodiments, the determined price may be the overall price of the well servicing treatment that is inclusive of the desired profitability. In other embodiments, the determined price may be the cost of the well servicing treatment to the provider of the well servicing treatment, wherein an additional profitability factor may be applied, as discussed below. The price of the well servicing treatment may be generated based on a relationship between the reference value total and a price for the well servicing treatment. The price may include the cumulative price of all portions and components (e.g., chemicals, tools, labor, and/or equipment) of the treatment, taking into account the specific well characteristics of the well servicing treatment. The relationship between the reference value total and the price of a well servicing treatment may be determined by collecting and analyzing historical data for a number of previous well servicing treatments. The historical data may include one or more well characteristics associated with the previous well servicing treatments and the overall price for the previous well servicing treatments that includes the price for the chemicals, tools, labor, and/or equipment utilized in the particular well servicing treatment. The relationship between the reference value total and the price of the well servicing treatment may be linear or nonlinear, depending, for example, on the determined relationship between reference value totals and price. Certain relationships may dictate an exponential relationship between the reference value total and a price for a well servicing treatment. One of ordinary skill in the art, with the benefit of this disclosure, will understand that other suitable methodologies for determining a price of a well servicing treatment based on a reference value total for the well servicing treatment may be used in accordance with the methods of the present invention. In some embodiments, this relationship may be expressed as a mathematical algorithm, wherein determining the price of the well servicing treatment may include utilization of the algorithm.

In other embodiments, this relationship may be utilized to develop a look-up table for determining a price of a well servicing treatment based on a reference value total, wherein a price for the well servicing treatment may be determined by utilizing the look-up table. An example look-up table for determining a price of a well servicing treatment may look like Table 3, below. In some embodiments, the look-up table may have a number of levels, wherein the specific number of levels will be based on the determined relationship between the reference value total and a price for a well servicing treatment. Each level may be given a value indicative of a price of a well servicing treatment based on the determined relationship. Listed below in Table 3 is an example look-up table for determining the price of a well servicing treatment based on a reference value total. One of ordinary skill in the art will know that the values listed in Table 3 are hypothetical examples and actual values will vary based on a number of factors, including, for example, the determined relationship between a price for a well servicing treatment and a reference value total.

TABLE 3

EXAMPLE LOOK-UP TABLE FOR DETERMINING PRICE

| Reference Value Total | Price |
|---|---|
| 2 | $ 10,000 |
| 4 | $ 20,000 |
| 6 | $ 40,000 |
| 8 | $ 80,000 |
| 10 | $160,000 |

Look-up tables are not continuous and may include multiple discrete levels. For example, in the embodiment shown in Table 3, there are five discrete prices listed for reference value totals of between 2 and 10. If the reference value was between or beyond one of these discrete levels, the associated price for the reference value total may be interpolated or extrapolated between the associated prices to determine the appropriate price for the well servicing treatment.

Referring again to FIG. 3, in some embodiments, profitability factors and/or discount factors may be applied to the price of the well servicing treatment that was determined in block 304. After determination of the price of the well servicing treatment in block 304, a determination may be made as to applying a profitability factor to the price of the well servicing treatment, depicted in block 305 of FIG. 3. If a profitability factor is to be applied, it is applied to the price of the well servicing treatment to provide a modified price of the well servicing treatment, depicted in block 306 of FIG. 3. If a profitability factor is not to be applied, this embodiment of the methods of the present invention moves to block 307, discussed further below. While application of a profitability factor to the price is optional, a profitability factor may be applied to provide a modified price, for example, when desired to adjust the profitability of a particular well servicing treatment as desired or to determine a price of the well servicing treatment that includes a desired profitability, for example, where the determined price is the cost of the well servicing treatment. For instance, application of a 10% profitability factor to a price of $10,000 provides a modified price of $11,000. Other suitable methods may be used to apply a profitability factor to the price.

As depicted in block 307 of FIG. 3, a determination may be made as to applying a discount factor to the price of the well servicing treatment. If a discount factor is to be applied, it is applied to the price of the well servicing treatment to provide a discounted price, depicted in block 308 of FIG. 3. If a discount factor is not to be applied, this embodiment of the methods of the present invention moves to block 310, discussed further below. While application of a discount factor to the price is optional, a discount factor may be applied to provide a discounted price as desired, for example, based on an existing agreement, the availability of raw materials, and other suitable factors. The discount factor should represent a percentage discount from the price that will be applied so that a discounted price may be determined. For example, application of a discount factor of 10% to a price of $10,000 provides a discounted price of $9,000. Other suitable methods may be used to apply a discount factor to the price. Those of ordinary skill in the art, with the benefit of this disclosure, will recognize that in some embodiments, a profitability factor may be applied to a discounted price, for example, to ensure that the treatment is not performed at a cost loss to the treatment provider.

In some embodiments, the methods of the present invention further may comprise transmitting the price of the well servicing treatment that was generated, depicted in block 310 of FIG. 3. In some embodiments, the price may be transmitted to the user as discussed above for the transmission of data by computer system 100 in relation to FIG. 2. Once transmitted to the user, a determination may be made as to whether the transmitted price was accepted by a customer, depicted in block 311. In some embodiments, the customer may be the user. In other embodiments, the user may be associated with a provider of well servicing treatments, wherein the user may have to transmit the price to the customer.

If the customer accepts the price that was transmitted thereto, in some embodiments, the methods of the present invention further may comprise completing a sale of the well servicing treatment based on the price of the well servicing treatment, depicted in block 312 of FIG. 3. Completing the sale of the well servicing treatment may be accomplished by utilizing any suitable technique for completing the sale of a well servicing treatment between a customer and a provider of well servicing treatments. In one embodiment, where the price of the well servicing treatment is transmitted by a data processing system (such as computer system 100, depicted on FIGS. 1-2) to the user (e.g., a customer) of a second data processing system (such as second computer system 204, depicted on FIG. 2) over a WAN, e.g., an Internet-based communication system, an online purchasing technique may be used. Any suitable online purchasing technique may be used, including, but not limited to, expedited online purchasing techniques, wherein required data for completing the purchase is saved so the purchasing technique does not include a step of submitting data. One of ordinary skill in the art, with the benefit of this disclosure, will be able to select an appropriate technique for completing the sale of the well servicing treatment for a particular application.

Referring again to FIG. 3, once a price of a well servicing treatment is determined, as discussed above, the methods of the present invention may further comprise performing the well servicing treatment, depicted in block 314. The well servicing treatments that may be performed may be any of a wide variety of well servicing treatments that may be performed in oil, gas, geothermal, and/or water wells, such as drilling, completion, and workover operations. The drilling, completion, and workover operations may include, but are not limited to, drilling, fracturing, acidizing, logging, gravel packing, cementing, perforating, and conformance operations.

As depicted in block 316, in some embodiments, it may next be determined whether an additional well servicing treatment will be performed. Any suitable technique may be used to determine whether another well servicing treatment will be performed. For example, a user may have the option of performing the methodology again to price the additional well servicing treatment, wherein the user may be prompted for a response. If an additional well servicing treatment is to be performed, the execution of the methodology moves to block 302 for obtaining one or more well characteristics of the additional well servicing treatment.

Some embodiments of the present invention may comprise utilizing a neural network. For example, the neural network may be used to determine the one or more well characteristics. In some embodiments, where the methods of the present invention are implemented on a data processing system, the data processing system may comprise a neural network. U.S. Pat. No. 6,002,985, the entire disclosure of which is incorporate herein by reference, describes utilization of a neural network in conjunction with well servicing treatments.

Figure 6:
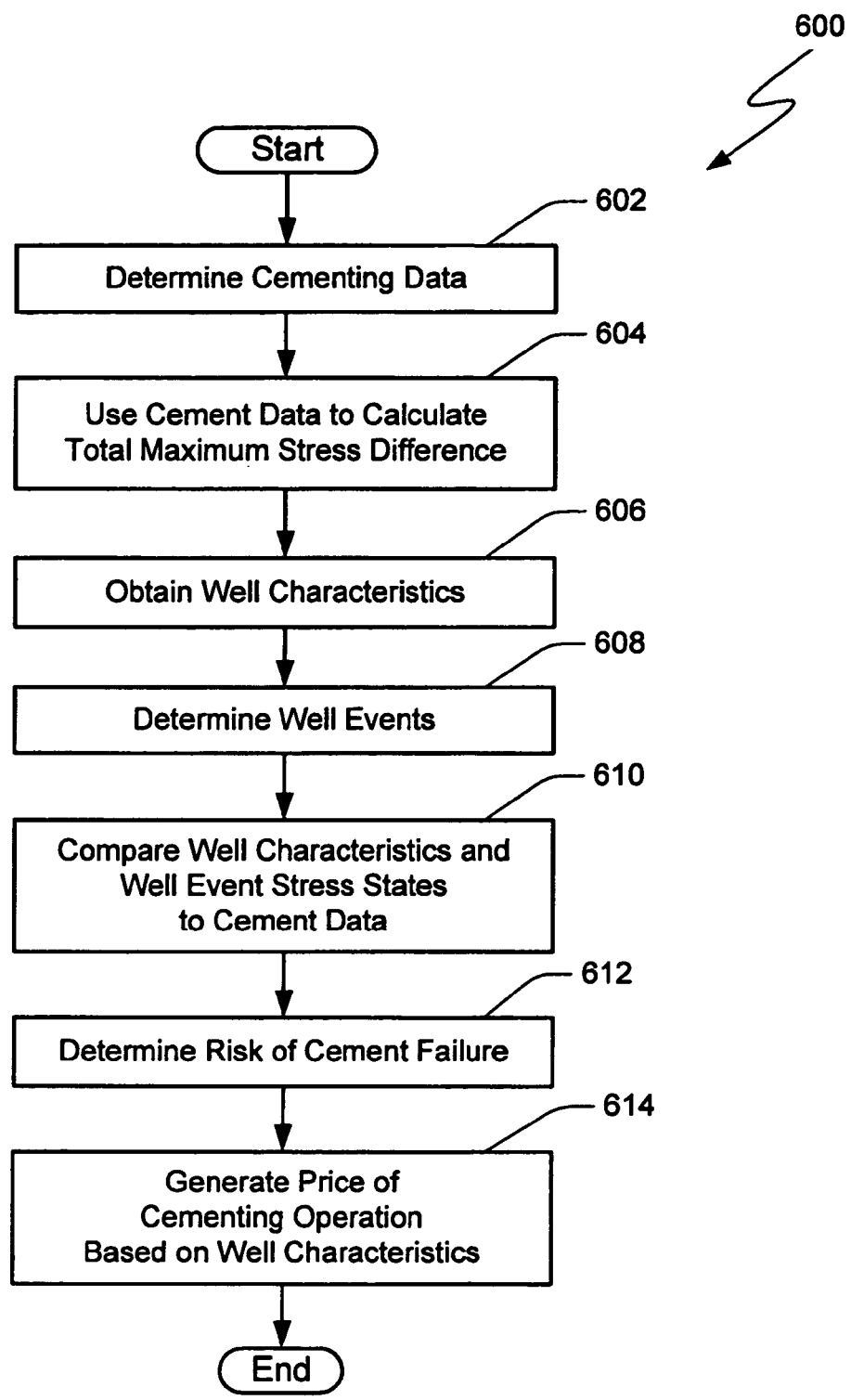
FIG. 6 is a flow chart for pricing a cementing operation and selecting a cement composition in accordance with an embodiment of the present invention.

In one embodiment, the methods of the present invention may be combined with a method of selecting a cement composition from a set of cement compositions. Referring now to FIG. 6, a flowchart is illustrated that depicts an embodiment of this combined method, generally referenced by numeral 600. Method 600 generally involves generating a price and selecting a cement composition from a set of cement compositions for a cementing operation. In one embodiment, method 600 may comprise determining cement data for each cement composition of the set of cement compositions, depicted in block 602; using the cement data to calculate a total maximum stress difference for each of the set of cement compositions, depicted in block 604; obtaining one or more well characteristics of the cementing operation, depicted in block 606; determining well events, depicted in block 608; comparing the one or more well characteristics and well event stress states to the cement data from each of the set of cement compositions to determine effective cement compositions for the cementing operation, depicted in block 610; determining the risk of cement failure for the effective cement compositions, depicted in block 612; and generating a price of the cementing operation based on the one or more well characteristics, depicted in block 614. Exemplary methodology for selecting a cement composition from a set of cement compositions is described in U.S. Pat. No. 6,697,738, the entire disclosure of which is incorporated herein by reference. Generating a price based on the one or more well characteristics in block 614 should be accomplished using the same methodology as for generating a price of the well servicing treatment based on one or more well characteristics as discussed above and shown in block 304 of FIG. 3.

In block 602, cement data for each cement composition of the set of cement compositions may be determined. Cement data include, but are not limited to, the following properties for each cement composition: Young's Modulus, Poisson's ratio, tensile strength, unconfined and confined triaxial data, hydrostatic data; oedometer data, compressive strength, porosity, permeability, and yield parameters, such as the Mohr-Coulomb plastic parameters (e.g., internal friction angle, "a," and cohesiveness, "c"). These properties may be determined by experimental measurements, such as tensile strength experiments, unconfined and confined triaxial experimental tests, hydrostatic tests, and oedometer tests. Yield parameters also may be estimated from suitable material models, such as Drucker Prager, Modified Cap, and Egg-Clam-Clay.

In block 604, the cement data is used to calculate a total maximum stress difference for each of the set of cement compositions. Generally, the stress state of a cement composition, both before and after hydration, may impact the long-term integrity of the cement sheath. Among other things, the integrity of the cement sheath may depend on the shrinkage and Young's modulus of the cement composition. The stress state of the cement compositions may be determined, both before and after hydration. Since the elastic stiffness of the cement composition evolves in parallel with the shrinkage process, the total maximum stress difference of a cement composition may be calculated using the following formula:

$$\Delta \sigma_{sh} = k \int_{\varepsilon_{sh(set)}}^{\varepsilon_{sh(total)}} E_{(\varepsilon_{sh})} \cdot d\varepsilon_{sh}$$

wherein $\Delta\sigma sh$ is the maximum stress difference due to shrinkage; k is a factor depending on the $E(\epsilon sh)$ Poisson ratio and the boundary conditions; is the Young's modulus of the cement depending on the advance of the shrinkage process; and $\epsilon sh$ is the shrinkage at a time (t) during setting or hardening.

In block 606, well characteristics of the cementing operations are obtained. Obtaining the well characteristics of the cement operation should be accomplished using the same methodology as for obtaining one or more well characteristics of a well servicing treatment as discussed above and shown in block 302 of FIG. 3.

In block 608, well events are determined. Examples of well events include, but are not limited to, cement hydration, pressure testing, well completions, hydraulic fracturing, hydrocarbon production, fluid injection, perforation, subsequent drilling, formation movement as a result of producing hydrocarbons at high rates from unconsolidated formation, and tectonic movement after the cement composition has been pumped into place. Well events include those events that are certain to happen during the life of the well, such as cement hydration, and those events that are readily predicted to occur during the life of the well, given a particular well's location, rock type, and other factors well known in the art.

In block 610, the one or more well characteristics and well event stress states are compared to the cement data from each of the set of cement compositions to determine effective cement compositions for the cementing operation. The cementing compositions that would be effective for sealing the subterranean zone and their capacity from its elastic limit are determined. In one embodiment, block 610 comprises using Finite Element Analysis to assess the integrity of the cement sheath during the life of the well. One software program that can accomplish this is the "WELLLIFE™" software program, available from Halliburton Energy Services, Duncan, Okla. The "WELLLIFE™" software program is built on the "DIANA™" Finite Element Analysis program, available from TNO Building and Construction Research, Delft, the Netherlands. For the comparison, all the cement compositions are assumed to behave linearly as long as their tensile strength or compressive shear strength is not exceeded. The material modeling adopted for the undamaged cement is a Hookean model bounded by smear cracking in tension and Mohr-Coulomb in the compressive shear. Shrinkage and expansion (volume change) of the cement compositions are included in the material model. Step 610 concludes by determining which cement compositions would be effective in maintaining the integrity of the resulting cement sheath for the life of the well.

In block 612, the risk of cement failure is determined. In these embodiments, parameters for risk of cement failure for the effective cementing compositions are determined. For example, even though a cement composition is deemed effective, one cement composition may be more effective than another. In one embodiment, the risk parameters are calculated as percentages of cement competency during the determination of the risk of cement failure in block 612.

Figure 7:
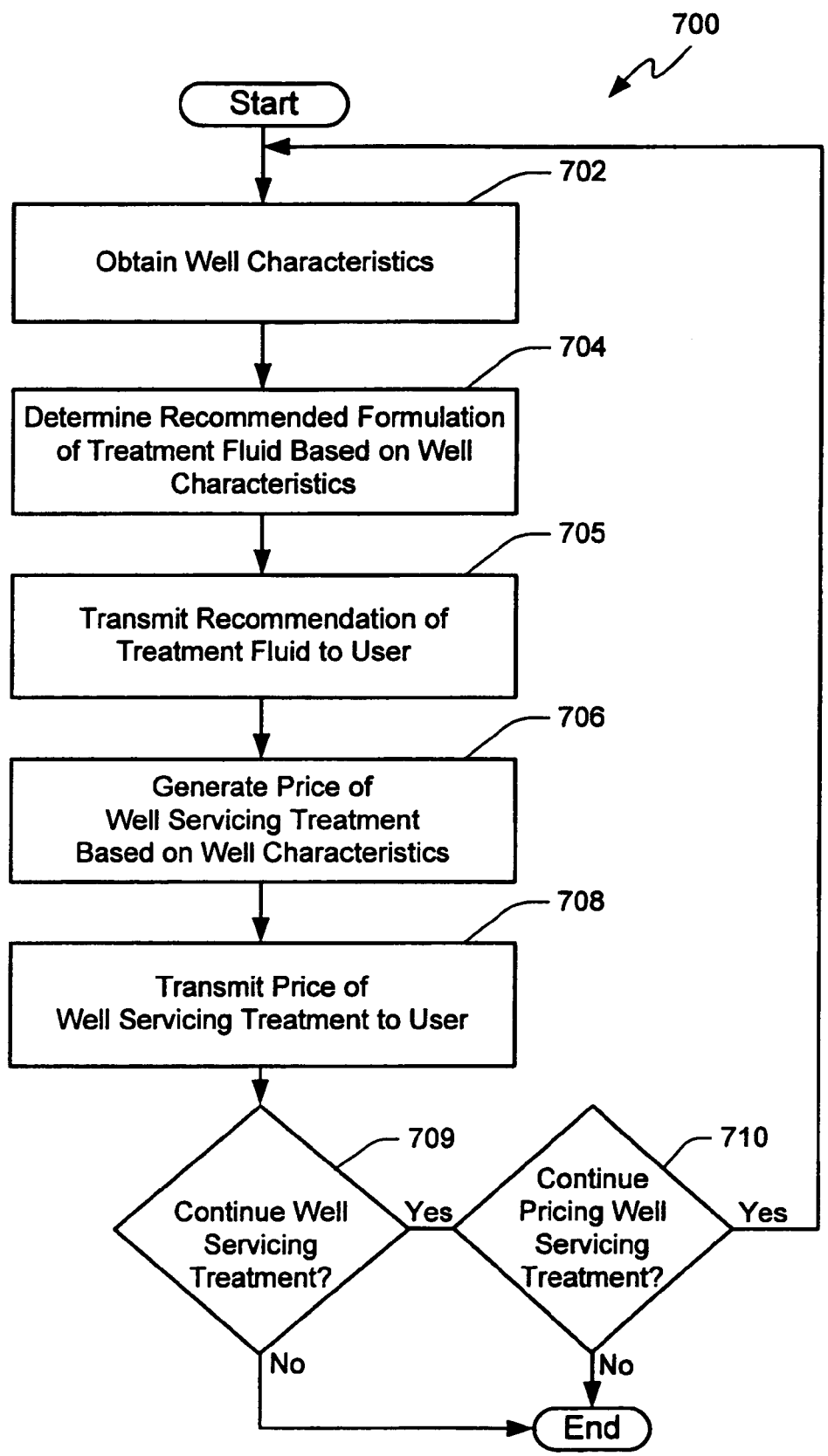
FIG. 7 and FIG. 8 are flow charts for pricing a well servicing treatment during real-time in accordance with certain embodiments of the present invention.

Referring now to FIG. 7, a flow chart is illustrated that depicts an embodiment of the present invention for utilizing the methods of the present invention in conjunction with a well servicing treatment to determine the price of the well servicing treatment in real-time, generally referred to as method 700. Method 700 comprises obtaining one or more well characteristics of a well servicing treatment from a well site while the well servicing treatment is in progress, depicted in block 702. As discussed above, the one or more well characteristics may be obtained by a data processing system capable of implementing the methods of the present invention, such as computer system 100, depicted on FIGS. 1-2. In certain embodiments, computer system 100 may obtain the data from well site 208 over any suitable communication link, for example, wireless communication system 210 (e.g., a satellite communication system) or WAN 212 (e.g., an Internet-based communication system) (depicted on FIG. 2). At well site 208, any sensing technique and equipment suitable for detecting well characteristics with suitable sensitivity and/or resolution may be used to determine the well characteristics that are to be obtained. In some embodiments, the well characteristics may be determined by using analytical methods, magnetic resonance imaging, formation evaluation, drill stem testing, logging tools, seismic methods, or other suitable techniques. For example, the well characteristics may be determined downhole with real-time date telemetry to the surface, or by delayed transfer (e.g., by storage of data downhole, followed by subsequent telemetry to the surface or subsequent retrieval of the downhole sensing device). In some embodiments, the well characteristics may be determined using any one or a combination of downhole logging-while-drilling sensors, measurement-while-drilling sensors, wireline and drillpipe-conveyed wireline tools, drillpipe-conveyed sensors, coiled tubing-conveyed sensors, casing-conveyed sensors, tractor-conveyed sensors, permanent downhole sensors, oilfield production data sensors, fluid-conveyed sensors, or other suitable sensors.

In block 704 of FIG. 7, method 700 of the present invention may further comprise determining a recommended formulation of a treatment fluid to use during the well servicing treatment based on the one or more well characteristics that were obtained. The recommended formulation should be determined while the well servicing treatment is in progress. The treatment fluid may be any suitable treatment fluid that may be used in oil, gas, geothermal, and/or water wells, such as those used during drilling, completion, and workover operations. Examples of treatment fluids include, but are not limited to, drilling fluids, completion fluids, cement compositions, stimulation fluids, and the like. Any suitable technique may be used to determine a recommended formulation of a treatment fluid. An example of a suitable technique for selecting a cement composition that may be incorporated into the methods of the present invention for determining a recommended formulation is described in U.S. Pat. No. 6,697,738 the entire disclosure of which is incorporated herein by reference.

In block 705, the selection of the treatment fluid may be transmitted to a user, wherein the selection is transmitted while the well servicing treatment is in progress. In some embodiments, the selection may be transmitted to the user by a data processing system, as discussed above for the transmission of data by computer system 100 in relation to FIG. 2.

In block 706, method 700 of the present invention may further comprise generating a price of the well servicing treatment based on the one or more well characteristics obtained during performance of the well servicing treatment. The price of the well servicing treatment should be generated while the well servicing treatment is in progress. Any suitable methodology may be used to generate a price of the well servicing treatment. In general, generating a price of the well servicing treatment utilizes the same methodology as for generating a price of the well servicing treatment based on one or more well characteristics, as discussed above in relation to block 304 of FIG. 3. In some embodiments, generation of a price further may take into account historical well characteristics that were obtained prior to obtaining the one or more well characteristics in block 704; for instance, these historical well characteristics may have been used to generate a price of the well servicing treatment prior to performance of the well servicing treatment. In some embodiments, these historical well characteristics may be used as default well characteristics that are used unless overridden by the one or more well characteristics that were obtained in block 702. Additionally, profitability and/or discount factors also may be applied to the revised price, as discussed above, in relation to blocks 306 and 308 of FIG. 3, respectively.

In block 708, the price of the well servicing treatment may be transmitted to a user, wherein the price is transmitted while the well servicing treatment is in progress. In some embodiments, the price may be transmitted to the user by a data processing system, such as computer system 100 (depicted in FIGS. 1-2), as discussed above, for the transmission of data by computer system 100 in relation to FIG. 2.

In block 709, it should be determined whether to continue the well servicing treatment based on the price that was transmitted to the user. Any suitable technique may be used to determine whether to continue the well servicing technique. For example, the execution of the method may be set so that the answer is always yes while the well servicing treatment is in progress, and the answer is always no after completion of the well servicing treatment. Or a user may have the option of continuing the well servicing treatment; for example, the user may be prompted for a response. If the well servicing treatment is to be continued, the execution of the methodology moves to block 710 for determining whether to continue pricing the well servicing treatment.

Once the price is transmitted to the user, it should be determined whether to continue pricing the well servicing treatment, depicted in block 710. Any suitable technique may be used to determine whether to continue pricing the well servicing treatment. For example, the execution of the method may be set so that the answer is always yes while the well servicing treatment is in progress, and the answer is always no after completion of the well servicing treatment. Or a user may have the option of performing the methodology again; for example, the user may be prompted for a response. If the pricing is to be continued, the execution of the methodology moves to block 702 for determining one or more well characteristics while the well servicing treatment is in progress.

Figure 8:
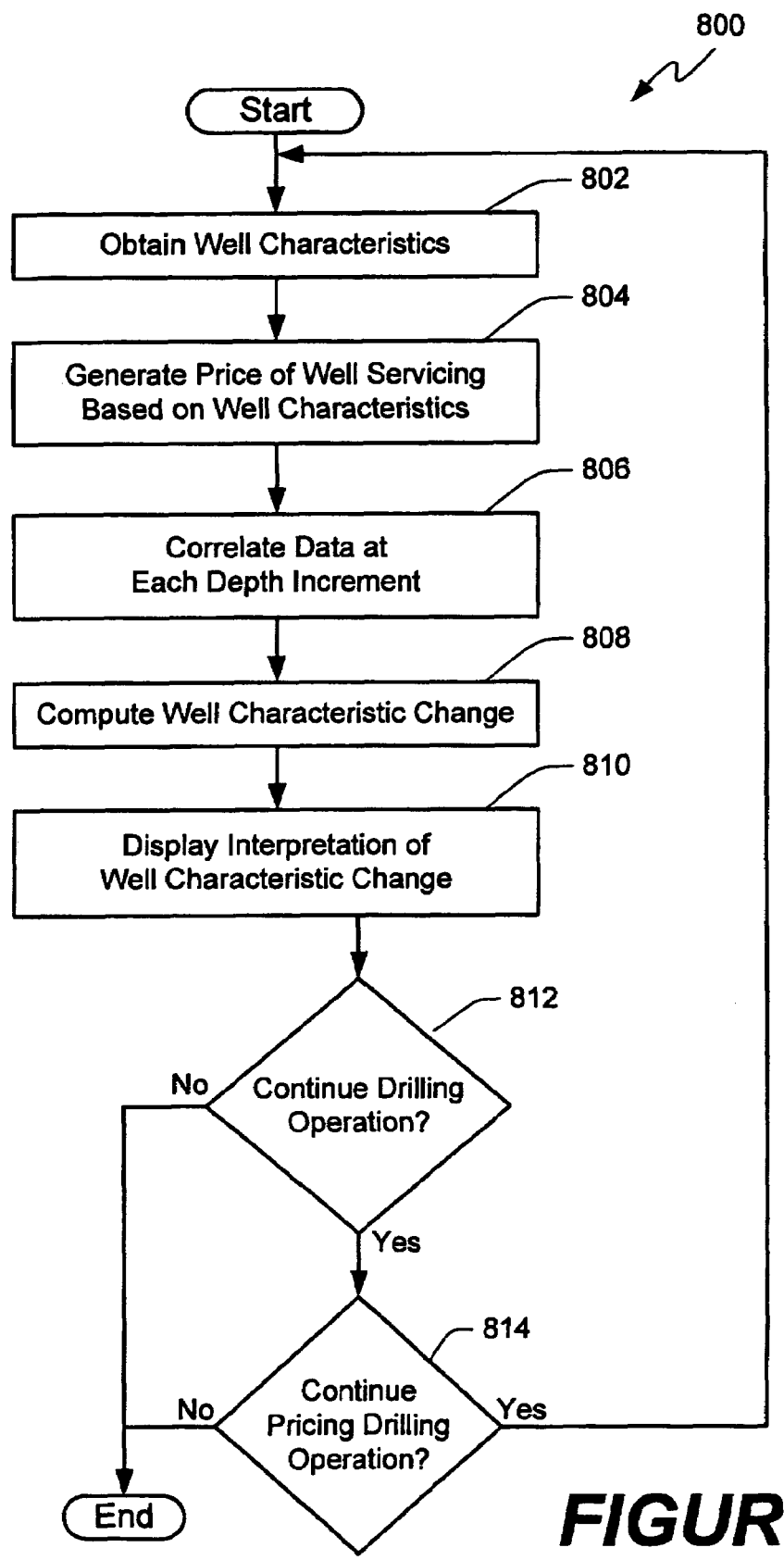

Referring now to FIG. 8, a flow chart is illustrated that depicts an embodiment of the present invention for pricing a drilling operation in real-time and detecting and visualizing changes in a well bore, generally referred to as method 800. In one embodiment, method 800 may comprise obtaining one or more well characteristics of the drilling operation, while the drilling operation is in progress, depicted in block 802; generating a price of the drilling operation based on the one or more well characteristics, wherein the price is generated while the drilling operation is in progress, depicted in block 804; correlating a time-depth file and a time-data file to obtain a plurality of measurements at a specific depth for a particular well characteristic, depicted in block 806; analyzing a change of the particular well characteristic, using at least two of the plurality of the measurements to obtain an interpretation of the change of the particular well characteristic, depicted in block 808; and displaying the interpretation of the change of the particular well characteristic using a graphical representation, depicted in block 810. Exemplary methodology for detecting and visualizing changes in a well bore is described in U.S. Pub. App. No. 2004/0138818, the entire disclosure of which is incorporated herein by reference.

Obtaining one or more well characteristics of the drilling operation in block 802 should be accomplished using the same methodology as for obtaining one or more well characteristics as discussed above in block 302 of FIG. 3. Furthermore, generating a price based on the one or more well characteristics in block 804 should be accomplished using the same methodology as for generating a price of the well servicing treatment based on one or more well characteristics as discussed above in block 304 of FIG. 3.

In block 806, the time-depth file and a time-data file are correlated to obtain a plurality of measurements at a specific depth for a particular well characteristic, depicted in block 806. Generally, the time-depth file may contain a column of clock time and a corresponding bit depth for each clock time. Generally, the time-data file may contain a column of clock time and a corresponding sensor measurement of the one or more well characteristics for each clock time. With a known offset between the bit depth and the measurement sensor, the one or more well characteristics may be determined at the corresponding formation depth.

Once a particular well characteristic is correlated for each depth increment, the changes for the particular well characteristic are computed, as depicted in block 808. Generally, computed changes for a particular well characteristic may be the difference and/or, alternatively, the rate of change between a base value for the particular well characteristic and subsequent value(s) for the particular well characteristic at a specific depth.

Once the changes have been computed, an interpretation of the change of the particular well characteristic may be displayed by using a graphical representation, depicted in block 810. In some embodiments, the interpretation may be displayed in a three-dimensional format. As one of ordinary skill in the art should understand, the changes in the particular well characteristic may correspond to specific changes in the formation or well bore, such as fracturing, that may be displayed in a graphical representation.

In block 812, it should be determined whether to continue the drilling operation based on the price that generated. Any suitable technique may be used to determine whether to continue the drilling operation. For example, the execution of the method may be set so that the answer is always yes while the drilling operation is in progress, and the answer is always no after completion of the drilling operation. Or a user may have the option of continuing the drilling operation; for example, the user may be prompted for a response. If the drilling operation is to be continued, the execution of the methodology moves to block 814 for determining whether to continue pricing the drilling operation.

Next, it should be determined whether to continue pricing the drilling operation, depicted in block 814. Any suitable technique may be used to determine whether to continue pricing the drilling operation. For example, the execution of the method may be set so that the answer is always yes while the drilling operation is in progress, and the answer is always no after completion of the drilling operation. Or a user may have the option of performing the methodology again; for example, the user may be prompted for a response. If the pricing is to be continued, the execution of the methodology moves to block 702 for determining one or more well characteristics while the drilling operation is in progress.

To facilitate a better understanding of the present invention, the following examples of certain embodiments are given. In no way should the following examples be read to limit, or to define, the scope of the invention.

Example

For a hypothetical cementing operation, well characteristics for a particular well were obtained as listed in Table 4

TABLE 4

| WCi | Well Characteristics | Determined Well Characteristic |
|---|---|---|
| WC1 | VERTICAL DEPTH | 5,000 FT |
| WC2 | BHCT | 150° F. |
| WC3 | DESIRED LEVEL OF FLUID LOSS | 200 CC |

After obtaining the well characteristics of the particular well, reference values for the provided well characteristics were determined. Look-up tables were used to determine the reference values for the provided well characteristics. The look-up tables used in this example for determining the reference values are provided below in Tables 5 to 7. The reference values provided in the look-up tables are exemplary only and do not correlate to actual reference values for the associated well characteristics.

TABLE 5

Well Characteristic 1

| VERTICAL DEPTH (FT) | REFERENCE VALUE |
|---|---|
| 1,000 | 1 |
| 5,000 | 2 |
| 10,000 | 3 |
| 15,000 | 4 |

TABLE 6

Well Characteristic 2

| BHCT (° F.) | REFERENCE VALUE |
|---|---|
| 100 | 1 |
| 150 | 2 |
| 200 | 3 |
| 250 | 4 |

TABLE 7

Well Characteristic 3

| DESIRED LEVEL OF FLUID LOSS (CC)[1] | REFERENCE VALUE |
|---|---|
| 500 | 1 |
| 400 | 2 |
| 300 | 3 |
| 200 | 4 |

[1]Determined in accordance with API RP 10B, Recommended Practices for Testing Well Cements.

Accordingly, a reference value for a vertical depth of 5,000 feet was determined to be 2, a reference value for a BHCT of 150° F. was determined to be 2, and a reference values for a desired level of fluid loss of 200 cc was determined to be 4. Next, the reference value total for the hypothetical cementing operation was determined based on the reference value for the provided well characteristics. The reference value total ("RV-TOTAL") was the summation of the reference value for each of the well characteristics. Accordingly, the reference value total for the hypothetical cementing operations was determined to be 8.

Once a reference value total was determined based on the determined reference value, the price for the well servicing treatment was determined based on the reference value total. A look-up table was used to determine the price of the hypothetical cementing operation based on the reference value total. The look-up table used in this example for determining the price is provided below in Table 8. The values indicated in the look-up table for the prices are exemplary only and do not correspond to an actual correlation between reference value total and prices.

TABLE 8

| reference Value Total | Price ($) |
|---|---|
| 2 | 4,000 |
| 4 | 6,000 |
| 6 | 8,000 |
| 8 | 10,000 |
| 10 | 12,000 |
| 12 | 14,000 |
| 14 | 16,000 |

Accordingly, the price for this hypothetical cementing operation was determined to be $10,000, based on a reference value total of 8. The results for this example are tabulated below in Table 9

TABLE 9

| WCi | Well Characteristic | Provided Well Characteristic | Reference Value |
|---|---|---|---|
| WC1 | VERTICAL DEPTH | 5,000 FT | 2 |
| WC2 | BHST | 150° F. | 2 |
| WC3 | DESIRED LEVEL OF FLUID LOSS | 200 CC | 4 |
| | REFERENCE VALUE TOTAL | | 8 |
| | PRICE | | $10,000 |

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation comprising:
   obtaining one or more well characteristics for a cementing operation, wherein the one or more well characteristics comprise at least one characteristic selected from the group consisting of a bottom-hole static temperature, an applicable environmental regulation, a type of formation, a type of hydrocarbon, a geographical area, a formation porosity, a formation permeability, a desired pump rate, a desired density of cement composition, a desired level of fluid loss control, a desired pump time, an existence of a thief zone, a corrosion potential, a pipe friction, an existence of reactive shale, and combinations thereof;
   determining a price of a well cement composition to be used in the cementing operation based on the one or more well characteristics, wherein the price of the well cement composition is determined based on the one or more well characteristics without determining a component cost of the well cement composition, wherein determining the price of the well cement composition comprises utilizing a data processing system;
   providing the well cement composition, wherein the steps of obtaining the one or more well characteristics, determining the price of the well cement composition, and providing the well cement composition are performed by a single user;
   placing the well cement composition in the subterranean formation; and
   allowing the well cement composition to set in the subterranean formation.

2. The method of claim 1 wherein the at least one characteristic is selected from the group consisting of the bottom-hole static temperature, the desired pump rate, the desired density of the cement composition, the desired level of fluid loss control, the desired pump time, and combinations thereof.

3. The method of claim 1 wherein the at least one characteristic is selected from the group consisting of the formation porosity, the formation permeability, the desired level of fluid loss control, the existence of a thief zone, and combinations thereof.

4. The method of claim 1 wherein the single user is an oilfield service company.

5. The method of claim 1 wherein the method further comprises updating the price of the well cementing composition during performance of the cementing operation.

6. The method of claim 5 wherein the method further comprising adjusting the cementing operation based on the updated price.

7. The method of claim 1 wherein determining the price comprises determining a reference value for each of the one or more well characteristics, wherein the reference value is correlated with the price of the well cement composition.

8. The method of claim 7 wherein determining the reference value for each of the one or more well characteristics comprising utilizing a look-up table.

9. The method of claim 7 wherein determining the price further comprises determining a reference value total for the well cement composition based on each reference value for the one or more well characteristics.

10. The method of claim 1 wherein the method further comprises transmitting the price of the well cement composition over a wireless communication system.

11. A method of cementing in a subterranean formation comprising:
obtaining one or more well characteristics for a cementing operation, wherein the one or more well characteristics comprise at least one characteristic selected from the group consisting of a bottom-hole static temperature, an applicable environmental regulation, a type of formation, a type of hydrocarbon, a geographical area, a formation porosity, a formation permeability, a desired pump rate, a desired density of cement composition, a desired level of fluid loss control, a desired pump time, an existence of a thief zone, a corrosion potential, a pipe friction, an existence of reactive shale, and combinations thereof;
determining a price of a well cement composition based on the one or more well characteristics, wherein the price of the well cement composition is determined based on the one or more well characteristics prior to performance of the cementing operation and without determining a component cost of the well cement composition, wherein determining the price of the well cement composition comprises utilizing a data processing system;
providing the well cement composition;
placing the well cement composition in the subterranean formation; and
allowing the well cement composition to set in the subterranean formation.

12. The method of claim 11 wherein the at least one characteristic is selected from the group consisting of the bottom-hole static temperature, the desired pump rate, the desired density of the cement composition, the desired level of fluid loss control, the desired pump time, and combinations thereof.

13. The method of claim 11 wherein the at least one characteristic is selected from the group consisting of the formation porosity, the formation permeability, the desired level of fluid loss control, the existence of a thief zone, and combinations thereof.

14. The method of claim 11 wherein the method further comprises updating the price of the well cementing composition during performance of the cementing operation.

15. The method of claim 11 wherein the method further comprising adjusting the cementing operation based on the updated price.

16. The method of claim 11 wherein determining the price comprises determining a reference value for each of the one or more well characteristics, wherein the reference value is correlated with the price of the well cement composition.

17. The method of claim 16 wherein determining the reference value for each of the one or more well characteristics comprising utilizing a look-up table.

18. The method of claim 16 wherein determining the price further comprises determining a reference value total for the well cement composition based on each reference value for the one or more well characteristics.

19. The method of claim 11 wherein the method further comprises transmitting the price of the well cement composition over a wireless communication system.

20. A method of cementing in a subterranean formation comprising:
obtaining one or more well characteristics for a cementing operation, wherein the one or more well characteristics comprise at least one characteristic selected from the group consisting of a bottom-hole static temperature, an applicable environmental regulation, a type of formation, a type of hydrocarbon, a geographical area, a formation porosity, a formation permeability, a desired pump rate, a desired density of cement composition, a desired level of fluid loss control, a desired pump time, an existence of a thief zone, a corrosion potential, a pipe friction, an existence of reactive shale, and combinations thereof;
determining a price of a well cement composition to be used in the cementing operation based on the one or more well characteristics, wherein the price of the well cement composition is determined based on the one or more well characteristics without determining a component cost of the well cement composition, wherein the determining the price comprises determining a reference value for each of the one or more well characteristics, wherein the reference value for each of the one or more well characteristics is correlated with the price of the well cement composition, and wherein determining the price comprises utilizing a data processing system;
providing the well cement composition;
placing the well cement composition in the subterranean formation; and
allowing the well cement composition to set in the subterranean formation.

21. The method of claim 20 wherein the at least one characteristic is selected from the group consisting of the bottom-hole static temperature, the desired pump rate, the desired density of the cement composition, the desired level of fluid loss control, the desired pump time, and combinations thereof.

22. The method of claim 20 wherein the at least one characteristic is selected from the group consisting of the formation porosity, the formation permeability, the desired level of fluid loss control, the existence of a thief zone, and combinations thereof.

23. The method of claim 20 wherein determining the price further comprises determining a reference value total for the well cement composition based on each reference value for the one or more well characteristics.

24. The method of claim 20 wherein determining the reference value for each of the one or more well characteristics comprising utilizing a look-up table.

25. The method of claim 24 wherein the relationship between the reference value and at least one of the one or more well characteristics in the look-up table is exponential.

26. The method of claim 24 wherein the relationship between the reference value and at least one of the one or more well characteristics in the look-up table is linear.

27. The method of claim 20 wherein determining the reference value for each of the one or more well characteristics comprises utilizing a mathematical algorithm.

* * * * *